United States Patent Office 3,709,886
Patented Jan. 9, 1973

3,709,886
PYRAZOLOPHTHALAZINONE COMPOUNDS AND PROCESS FOR PREPARATION THEREOF
Giangiacomo Nathansohn, Milan, Italy, assignor to Gruppo Lepetit, S.p.A., Milan, Italy
No Drawing. Filed Oct. 14, 1970, Ser. No. 80,775
Int. Cl. C07d 51/06
U.S. Cl. 260—250 A                15 Claims

ABSTRACT OF THE DISCLOSURE

Pyrazolo[1,2 - b]phthalazine - 1,5(10H)-diones corresponding to the formula

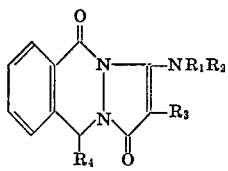

wherein $R_1$ and $R_2$ are hydrogen, lower alkyl, halo-lower alkyl, aralkyl, aryl or acyl, $R_1$ and $R_2$ taken together with the adjacent nitrogen atom forming a heterocyclic ring containing 1-2 heteroatoms, $R_3$ is hydrogen, halogen, lower alkyl, aryl and acyl, and $R_4$ represents hydrogen, lower alkyl or aryl are disclosed. The compounds are prepared by reacting a corresponding 3,4-dihydro-1(2H)-phthalazinone with an unsaturated carboxylic acid acyl chloride derivative of the formula

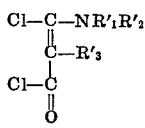

wherein $R'_1$ and $R'_2$ are the same as $R_1$ and $R_2$, except that hydrogen and acyl are excluded, and $R'_3$ represents halogen, lower alkyl and aryl. The process is carried out in an inert organic solvent in the presence of a tertiary amine. The new compounds of the present invention are suitable for use as anti-inflammatory, analgesic and antipyretic agents.

---

This invention is concerned with new heterocyclic compounds and a process for their preparation. More particularly, the compounds with which this invention is concerned are pyrazolo[1,2-b]phthalazine-1,5(10H)-diones of the formula:

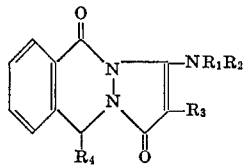
(1)

wherein $R_1$ and $R_2$ are independently selected from the group consisting of hydrogen, lower alkyl, halo-lower alkyl, aralkyl, aryl and acyl, $R_1$ and $R_2$, taken together with the adjacent nitrogen atom form a heterocyclic ring containing 1-2 heteroatoms, $R_3$ is selected from hydrogen, halogen, lower alkyl, aryl or acyl, and $R_4$ represents hydrogen, lower alkyl, or aryl. The term "lower alkyl" as used herein includes groups having from 1 to about 6 carbon atoms.

The compounds of the invention are prepared by contacting at room temperature, usually in substantially equimolecular amounts, a 3,4-dihydro-1(2H)-phthalazinone corresponding to the formula

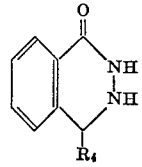

wherein $R_4$ has the above significance, with an unsaturated carboxylic acid acyl chloride compound of the formula

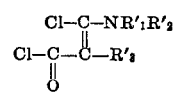

in which $R'_1$ and $R'_2$ are the same as $R_1$ and $R_2$ except that hydrogen and acyl are excluded and $R'_3$ represents halogen, lower alkyl, and aryl, in an inert organic solvent in the presence of a tertiary amine. The reaction time may vary according to the nature of the selected acyl chloride; generally 2-6 hours are sufficient to have complete reaction. As to the solvent, benzene, toluene, xylene and other cyclic unsaturated hydrocarbons are useful, although oxygenated solvents may be successfully employed such as dioxane and tetrahydrofuran. The preferred tertiary amines are tri-lower alkylamines, such as trimethylamine, triethylamine and the like, although other aliphatic amines, such as tris-(β-hydroxyethyl)amine, or heterocyclic amines, such as piperidine and morpholine, may equally be employed.

The pyrazolophthalazinones prepared as described above can be, if desired, subjected to further treatment, in order to modify the substituent groups bound to the pentatomic ring. These modifications are carried out according to conventional methods, and lead to the formation of compounds, which are also contemplated as within the scope of this invention.

First of all, by subjecting a compound of Formula 1, in which $R_3$ is chloride to mild hydrogenation at room temperature and atmospheric pressure, in the presence of a catalyst, such as palladium on charcoal, the corresponding 2-unsubstituted, i.e., (2H), pyrozolophthalazinone is obtained. This can, in turn, be acylated at position 2 by means of an acylating agent, such as a carboxylic acid chloride or anhydride.

Moreover, if a N-benzylamino or N,N-dibenzylamino compound of Formula 1 is hydrogenated under stronger conditions, the benzyl radicals can be split off to give the corresponding 3-amino compound. According to a preferred embodiment the hydrogenation is effected in a lower alkanol solution, at a temperature from about 50° C. to 100° C., under a pressure ranging from 10 to 50 atmospheres, in the presence of a palladium on charcoal, as the catalyst. The free amino compounds may be further acylated to acetylamino or diacetylamino species according to conventional methods. Besides the compounds exemplified hereinafter, the following pyrazolophthalazinones are representative of those contemplated by this invention and may be prepared by the procedures discussed herein:

2-methyl-3-dipentylamino-1H-pyrazolo[1,2-b]phthalazine-1,5(10H)-dione,
2-methyl-3-di-tert-pentylamino-1H-pyrazolo[1,2-b]phthalazine-1,5(10H)-dione,
2-phenyl-3-dibutylamino-1H-pyrazolo[1,2-b]phthalazine-1,5-(10H)-dione,
2-phenyl-3-pyrrolidino-1H-pyrazolo[1,2-b]phthalazine-1,5(10H)-dione, 2-phenyl-3-piperidino-1H-pyrazolo[1,2-b]phthalazine-1,5(10H)-dione,
2-phenyl-3-morpholino-1H-pyrazolo[1,2-b]phthalazine-1,5(10H)-dione,
2-chloro-3-dipropylamino-1H-pyrazolo[1,2-b]phthalazine-1,5(10H)-dione,
2-chloro-3-dibutylamino-1H-pyrazolo[1,2-b]phthalazine-1,5(10H)-dione,
2-chloro-3-(N-phenyl-N-methylamino)-1H-pyrazolo[1,2-b]phthalazine-1,5(10H)-dione,
2-chloro-3-pyrrolidino-1H-pyrazolo[1,2-b]phthalazine-1,5(10H)-dione,
2-chloro-3-morpholino-1H-pyrazolo[1,2-b]phthalazine-1,5(10H)-dione,
2-methyl-3-piperidino-10-methyl-1H-pyrazolo[1,2-b]phthalazine-1,5(10H)-dione,
2-chloro-3-diethylamino-10-methyl-1H-pyrazolo[1,2-b]phthalazine-1,5(10H)-dione,
2-chloro-3-pyrrolidino-10-methyl-1H-pyrazolo[1,2-b]phthalazine-1,5(10H)-dione,
2-methyl-3-piperidino-10-phenyl-1H-pyrazolo[1,2-b]phthalazine-1,5(10H)-dione,
2-methyl-3-diethylamino-10-phenyl-1H-pyrazolo[1,2-b]phthalazine-1,5(10H)-dione, and
2-chloro-3-pyrrolidino-10-phenyl-1H-pyrazolo[1,2-b]phthalazine-1,5(10H)-dione.

The compounds of the invention show a high degree of anti-inflammatory, analgesic and antipyretic activity, coupled with a low toxicity. In fact, the new pyrazolophthalazinone ring compounds of the present invention when tested on rats displayed a remarkable activity in the carrageenin and granuloma pellet tests. The compounds were found to be pharmacologically active per os even at a dose about 10–20 times smaller than the toxic one, which in rats ranges from 500 to more than 1000 mg./kg. per os.

The preferred routes of administration are orally and rectally, though other manners can be usefully employed. In the first case, ordinarily the drugs are compounded into pharmaceutical dosage forms such as tablets, capsules, elixirs, solutions and the like. The dosage unit may contain the usual excipients like starches, gums, alcohols, sugars, fatty acids, etc. Also the rectal route proved quite suitable, the drug being administered in this case in the form of suppositories, admixed with conventional vehicles such as cocoa butter, wax, spermaceti, or polyoxyethylene glycols and their derivatives.

The dosage range is from about 0.05 to about 1.00 g. per day, preferably administered in divided doses.

The following examples are intended to illustrate the invention claimed herein without unduly restricting it.

EXAMPLE 1

2-methyl - 3 - diethylamino-1H-pyrazolo[1,2 - b]phthalazine-1,5(10H)-dione.—To a solution of 98.5 g. of 3,4-dihydro-1(2H)-phthalazinone and 157.7 g. of triethylamine in 4600 ml. of anhydrous toluene, previously cooled to 0° C., an amount of 163 g. of 2-(α-chloro-α-diethylaminomethylidene)-propionyl chloride in 500 ml. of anhydrous toluene is slowly added over a period of 30 minutes. The temperature is allowed to rise to room temperature and the reaction mixture is stirred for 2 hours. After this time the liquid is filtered, washed three times with water and made anhydrous over sodium sulfate. The solvent is distilled off in vacuo and the residue crystallized from acetone. Yield: 132.4 g. (69.6%) of 2-methyl-3-diethylamino-1H-pyrazolo[1,2-b]phthalazine - 1,5(10H)-dione; M.P. 125–127° C.

EXAMPLE 2

2-butyl - 3 - diethylamino - 1H - pyrazolo[1,2-b]phthalazine-1,5(10H)-dione.—An amount of 14.8 g. of 3,4-dihydro-1(2H)-phthalazinone dissolved in a mixture of 29 ml. of triethylamine and 300 ml. of anhydrous dioxane is reacted at 5–10° C. with 33 g. (assay 75% w./w.) of 2-[α-chloro-α-diethylaminomethylidene]-caproyl chloride in 100 ml. of anhydrous toluene, substantially according to the process described in Example 1. Yield: 24.5 g. (75.0%) of 2-butyl-3-diethylamino-1H-pyrazolo[1,2-b]phthalazine-1,5(10H)-dione; B.P. 190° C./0.6 mm. Hg.

EXAMPLE 3

2-methyl-3-dimethylamino - 1H-pyrazolo[1,2-b]phthalazine-1,5(10H)-dione.—The titled compound is prepared by the process described in Example 1 from 14.8 g. of 3,4-dihydro-1(2H)-phthalazinone and 18.2 g. of 2-(α-chloro-α-dimethylaminomethylidene) - propionyl chloride. Yield: 20.8 g. (81.0%) of 2-methyl-3-dimethylamino-1H-pyrazolo[1,2-b]phthalazine-1,5(10H)-dione; M.P. 142–144° C.

EXAMPLE 4

2-butyl - 3 - dimethylamino-1H-pyrazolo[1,2-b]phthalazine-1,5(10H)-dione.—The titled compound is prepared by the process described in Example 1 from 12.7 g. of 3,4-dihydro-1(2H)-phthalazinone and 19.30 g. of 2-(α-chloro - α - dimethylaminomethylidene)-caproyl chloride. Yield: 20.1 g. (78.2%) of 2-butyl-3-dimethylamino-1H-pyrazolo[1,2-b]phthalazine-1,5(10H)-dione; M.P. 114.5–117.5° C.

EXAMPLE 5

2-phenyl - 3-dimethylamino-1H-pyrazolo[1,2-b]phthalazine-1,5(10H)-dione.—The titled compound is prepared by the process described in Example 1 from 19.1 g. of 3,4-dihydro-1(2H)-phthalazinone and 45 g. (assay 75% w./w.) of 2-(α-chloro-α-dimethylaminomethylidene)-2-phenylacetyl chloride. Yield: 31.5 g. (76.5%) of 2-phenyl-3 - dimethylamino - 1H - pyrazolo[1,2 - b]phthalazine-1,5-(10H)-dione: M.P. 152–153° C.

EXAMPLES 6–23

The following compounds are prepared substantially according to the process illustrated in Example 1:

| Example No. | —NR₁R₂ | R₃ | R₄ | M.P. or B.P. ° C. | Yield, percent |
|---|---|---|---|---|---|
| 6 | 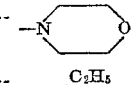 | —C₄H₉ | H | 161–163 | 84.3 |
| 7 | 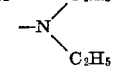 | —Cl | H | 154–155.5 | 79.8 |
| 8 | 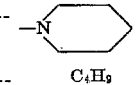 | —C₄H₉ | H | 126–128 | 81.1 |
| 9 | 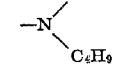 | —CH₃ | H | 66–67.5 | 73.4 |
| 10 | 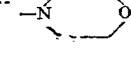 | —CH₃ | H | 188–190 | 71.0 |

| Example No. | Compound —NR₁R₂ | R₃ | R₄ | M.P. or B.P. °C. | Yield, percent |
|---|---|---|---|---|---|
| 11 | —N(C₆H₅)(CH₃) | —CH₃ | H | 136–138 | 65.9 |
| 12 | —N(C₃H₇)(C₃H₇) | —CH₃ | H | 225/0.6 mm. Hg | 79.2 |
| 13 | —N(C₂H₅)(C₂H₅) | —C₃H₇ | H | 200/0.8 mm. Hg | 86.4 |
| 14 | Same as above | —C₂H₅ | H | 75–77 | 84.5 |
| 15 | —N (piperidino) | —CH₃ | H | 158.5–160 | 77.3 |
| 16 | —N(C₂H₅)(C₂H₅) | —CH₃ | —CH₃ | 112–114 | 79.8 |
| 17 | Same as above | —CH₃ | —C₆H₅ | 230/0.6 mm. Hg | 63.4 |
| 18 | —N(CH₂CH₂Cl)(CH₂CH₂Cl) | —CH₃ | H | 161–163 | 68.7 |
| 19 | —N(CH₂C₆H₅)(CH₃) | —CH₃ | H | 136–138 | 76.0 |
| 20 | —N(CH₂C₆H₅)(CH₂C₆H₅) | —CH₃ | H | 177–180 | 86.0 |
| 21 | —N(CH₂—CH₃)(CH₂C₆H₅) | —CH₃ | H | 138 | 88.0 |
| 22 | —N(CH₃)(CH₃) | —Cl | H | 184–186 | 66.0 |
| 23 | —N (morpholino) | —Cl | H | 164 | 52.0 |

EXAMPLE 24

3-diethylamino - 1H - pyrazolo[1,2 - b]phthalazine-1,5-(10H)-dione.—An amount of 1.5 g. of 2-chloro-3-diethylamino-1H-pyrazolo[1,2-b]phthalazine-1,5(10H) - dione is dissolved in 150 ml. of glacial acetic acid and hydrogenated in the presence of 0.75 g. of 10% palladium on charcoal, as the catalyst. The mixture is filtered and the filtrate evaporated in vacuo to dryness. The residue consisting of 3-diethylamino-1H-pyrazolo[1,2 - b]phthalazine-1,5(10H)-dione is crystallized from acetone. Yield: 1.18 g. (88.7%), M.P. 135–137° C.

EXAMPLES 25 AND 26

The following compounds are prepared according to the method of the previous example:

| Example No. | Compound | M.P. °C. | Yield, Percent |
|---|---|---|---|
| 25 | 3-dimethylamino-1H-pyrazolo-[1,2-b]phthalazine-1,5(10H)-dione. | ¹ 171–3 | 85.0 |
| 26 | 3-morpholino-1H-pyrazolo[1,2-b]-phthalazine-1,5(10H)-dione. | ² 235–8 | 87.0 |

¹ Recrystallized from acetone.
² Recrystallized from ethanol.

EXAMPLE 27

2-acetyl - 3 - diethylamino-1H-pyrazolo[1,2 - b]phthalazine-1,5(10H)-dione.—Four grams of 3-diethylamino-1H-pyrazolo[1,2 - b]phthalazine-1,5(10H)-dione are acetylated by refluxing it for 1.5 hours with 8 ml. of acetyl chloride. After this time the excess of the second reagent is distilled off in vacuo, the residue dissolved in 200 ml. of benzene and the benzene solution washed first with 10% aqueous sodium bicarbonate, then with water. The organic phase is separated, dried over sodium sulfate, and the benzene distilled off in vacuo. The residue consisting of 2-acetyl - 3 - diethylamino-1H-pyrazolo[1,2 - b]phthalazine-1,5(10H)-dione is recrystallized from methanol. Yield: 3.7 g. (80.0%); M.P. 174–176° C.

EXAMPLE 28

2-acetyl - 3 - dimethylamino-1H-pyrazolo[1,2-b]phthalazine-1,5(10H)-dione.—Following the method described in Example 27 and starting from 3-dimethylamino-1H-pyrazolo[1,2-b]phthalazine-1,5(10H)-dione the compound 2-acetyl - 3 - dimethylamino - 1H - pyrazolo[1,2-b]phthalazine-1,5(10H)-dione which melts at 201–4° C. (recrystallized from methanol) is obtained in a 63% yield.

EXAMPLE 29

(a) 2-methyl-3-methylamino-1H-pyrazolo[1,2-b]phthalazine-1,5(10H)-dione
(b) 2-methyl-3-(N-acetyl-N-methyl)amino-1H-pyrazolo[1,2-b]phthalazine-1,5(10H)-dione (a) An amount of 6.6 g. of 2-methyl-3-(N-benzyl-N-methylamino) - 1H-pyrazolo[1,2 - b]phthalazine - 1,5-(10H)-dione is dissolved in 100 ml. of ethanol and hydrogenated during 7 hours at 75° C. under a pressure of 35 atm. in the presence of 0.8 g. of 10% palladium on charcoal, as the catalyst. After this time the mixture is filtered and the solution concentrated to dryness in vacuo. The residue is recrystallized from methanol, giving 3.1 g. (64.4%) of 2-methyl-3-methylamino-1H-pyrazolo[1,2-b]phthalazine-1,5-(10H)-dione; M.P. 207–209° C.

(b) The respective 3-N-acetyl derivative is obtained by treatment with acetic acid chloride or anhydride in the presence of an excess of triethylamine according to conventional methods. M.P. 216–8° C. (recrystallized from acetone). Yield 85%.

EXAMPLE 30

(a) 3-ethylamino-2-methyl-1H-pyrazolo[1,2-b]phthalazine-1,5(10H)-dione
(b) 3-(N-acetyl-N-ethyl)amino-2-methyl-1H-pyrazolo[1,2-b]phthalazine-1,5(10H)-dione The compounds are prepared according to the same method described in Example 29.

(a) 3-ethylamino-2-methyl-1H-pyrazolo[1,2-b]phthalazine-1,5(10H)-dione, melts at 151–2° C. (recrystallized from ethanol). Yield 79%.

(b) 3-(N-acetyl-N-ethyl)amino - 2-methyl-1H-pyrazolo[1,2-b]phthalazine-1,5(10H)-dione melts at 151–4° C. (recrystallized from acetone). Yield 91%.

EXAMPLE 31

(a) 3-amino-2-methyl-1H - pyrazolo[1,2-b]phthalazine-1,5(10H)-dione
(b) 3-acetylamino-2-methyl - 1H-pyrazolo[1,2-b]phthalazine-1,5(10H)-dione
(c) 3-diacetylamino-2-methyl-1H-pyrazolo[1,2-b]phthalazine-1,5(10H)-dione (a) By hydrogenating 3-dibenzylamino-2-methyl-1H-pyrazolo[1,2-b]phthalazine-1,5(10H)-dione for 7 hours at 100° C. under a pressure of 50 atm. and by operating substantially as described in Example 29, two equimolecular amounts of hydrogen are taken off. The compound 3-amino-2 - methyl-1H - pyrazolo[1,2-b]phthalazine-1,5 (10H)-dione which melts at 241–5° C. (recrystallized from ethanol) is obtained in a 75% yield.

(b) and (c) The 3-acetylamino and 3-diacetylamino derivatives thereof are obtained by treatment respectively with one or two equimolecular amounts of acetyl chloride and an excess of triethylamine. 3-acetylamino-2-methyl-1H-pyrazolo[1,2-b]phthalazine - 1,5(10H)-dione melts at 220–2° C. (recrystallized from acetone). Yield 40%. 3-diacetylamino-2 - methyl - 1H-pyrazolo[1,2-b]phthalazine-1,5(10H)-dione melts at 162–3° C. (recrystallized from acetone-diethylether 3/1). Yield 47%.

EXAMPLE 32

3-amino-1H - pyrazolo[1,2-b]phthalazine - 1,5(10H)-dione.—By operating in the same way as described in Example 31(a) and by consuming three equimolecular amounts of hydrogen, the crude 2-chloro-3-dibenzylamino-1H-pyrazolo[1,2-b]phthalazine - 1,5(10H)-dione, prepared according to Example 1 by reacting 3,4-dihydro-1(2H)-phthalazinone with the appropriate unsaturated carboxylic acyl chloride derivative as defined hereinbefore, is hydrogenated to 3-amino-1H-pyrazolo[1,2-b]phthalazine-1,5(10H)-dione. M.P. 283–5° C. (recrystallized from N-butanol). Yield 20%.

The acyl chloride starting materials are prepared by the procedure of Buyle et al., Tetrahedron 24 (1968), 4217. The phthalazinone starting materials are prepared by the procedure of Bellasio, Ann. Chim. (Rome) 59 (1969), 443.

What is claimed is:

1. A process for preparing pyrazolophthalazinones of the formula

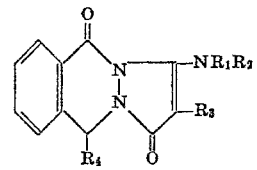

wherein $R_1$ and $R_2$ are independently selected from the group consisting of hydrogen, lower alkyl, chloro-lower alkyl, bromo-lower alkyl, benzyl, phenyl and acetyl, $R_1$ and $R_2$ taken together with the adjacent nitrogen atom forming a heterocyclic radical of the group consisting of morpholino, piperidino and pyrrolidino, $R_3$ is hydrogen, chloro, bromo, lower alkyl, phenyl or acetyl, and $R_4$ represents hydrogen, lower alkyl or phenyl, which comprises contacting a phthalazine reactant of the formula

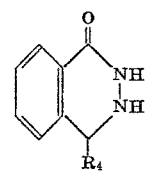

wherein $R_4$ has the above significance with an acyl chloride reactant of the formula

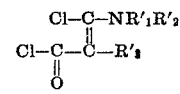

wherein $R'_1$ and $R'_2$ are the same as $R_1$ and $R_2$ except that hydrogen and acetyl are excluded, $R'_3$ represents chloro, bromo, lower alkyl and phenyl, in an inert organic solvent of the group of cyclic unsaturated hydrocarbons, dioxane and tetrahydrofuran in the presence of a tertiary amine of the group of tri-(lower alkyl)amines, tris-(β-hydroxyethyl)amine, piperidine and morpholine.

2. The process as defined in claim 1 wherein the phthalazine reactant and acyl chloride reactants initially are present in about equimolar amounts and said process is carried out at about room temperature.

3. The process as defined in claim 2 wherein the $R'_3$ group of the acyl chloride reactant is chloro or bromo and including the step of hydrogenating the resulting 2-halo-pyrazolophthalazinone compounds thereby to prepare the corresponding (2H)-pyrazolophthalazinone.

4. The process as defined in claim 3 wherein the hydrogenation is carried out in the presence of palladium on charcoal as a catalyst.

5. The process as defined in claim 3 and including the step of treating the (2H)-pyrazolophthalazinone product with an acetyl chloride or acetic anhydride thereby preparing the corresponding 2-acyl-pyrazolophthalazinone.

6. The process as defined in claim 2 wherein the $R'_1$ and $R'_2$ groups of the acyl chloride reactant are benzyl and including the step of hydrogenating the resulting 3-benzylamino pyrazolophthalazinone product thereby preparing the corresponding 3-amino pyrazolophthalazinone.

7. The process as defined in claim 6 and including the step of treating the 3-amino pyrazolophthalazinone with an acetyl chloride or acetic anhydride thereby preparing the corresponding 3-acylamino-pyrazolophthalazine.

8. Pyrazolophthalazinone compounds of the formula:

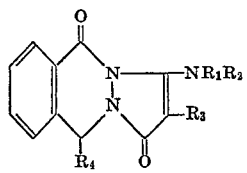

wherein $R_1$ and $R_2$ are independently selected from the group consisting of hydrogen, lower alkyl, chloro-lower alkyl, bromo-lower alkyl, benzyl, phenyl and acetyl; $R_1$ and $R_2$, taken together with the adjacent nitrogen atom forming a heterocyclic radical of the group consisting of morpholino, piperidino and pyrrolidino, $R_3$ is hydrogen, chloro, bromo, lower alkyl, phenyl or acetyl, and $R_4$ represents hydrogen, lower alkyl or phenyl.

9. A compound as defined in claim 8 which is 2-methyl-3-diethylamino-1H - pyrazolo[1,2-b]phthalazine-1,5(10H)-dione.

10. A compound as defined in claim 8 which is 2-butyl-3-diethylamino-1H - pyrazolo[1,2-b]phthalazine-1,5(10H)-dione.

11. A compound as defined in claim 8 which is 2-methyl-3 - dimethylamino - 1H-pyrazolo[1,2-b]phthalazine-1,5(10H)-dione.

12. A compound as defined in claim 8 which is 2-butyl-3-diethylamino - 1H - pyrazolo[1,2-b]phthalazine - 1,5 (10H)-dione.

13. A compound as defined in claim 8 which is 2-phenyl-3 - dimethylamino - 1H-pyrazolo[1,2-b]phthalazine-1,5(10H)-dione.

14. A compound as defined in claim 8 which is 3-amino-2 - methyl - 1H - pyrazolo[1,2-b]phthalazine-1,5 (10H)-dione.

15. A compound as defined in claim 8 which is 3-amino-1H - pyrazolo[1,2-b]phthalazine-1,5(10H)-dione.

References Cited

UNITED STATES PATENTS 3,557,108   1/1971   Bellasio et al. _ _ _ _   260—250 A

NICHOLAS S. RIZZO, Primary Examiner

U.S. Cl. X.R.

260—247.2 A; 424—250, 248

UNITED STATES PATENT OFFICE
CERTIFICATE OF CORRECTION

Patent No. 3,709,886      Dated January 9, 1973

Inventor(s) GIANGIACOMO NATHANSOHN

It is certified that error appears in the above-identified patent and that said Letters Patent are hereby corrected as shown below:

Column 1, in the heading after line 6, insert

-- claims priority Italy 23885-A/69 October 27, 1969 -- .

Signed and sealed this 20th day of November 1973.

(SEAL)
Attest:

EDWARD M. FLETCHER, JR.       RENE D. TEGTMEYER
Attesting Officer       Acting Commissioner of Patents